US009768447B2

(12) United States Patent
Nakamura et al.

(10) Patent No.: US 9,768,447 B2
(45) Date of Patent: Sep. 19, 2017

(54) NEGATIVE ELECTRODE MATERIAL FOR LITHIUM ION SECONDARY BATTERY (71) Applicant: SHOWA DENKO K.K., Tokyo (JP)

(72) Inventors: Takeshi Nakamura, Tokyo (JP); Nobuaki Ishii, Tokyo (JP); Yuta Hirano, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 10 days.

(21) Appl. No.: 14/894,201

(22) PCT Filed: May 30, 2014

(86) PCT No.: PCT/JP2014/064375
§ 371 (c)(1),
(2) Date: Nov. 25, 2015

(87) PCT Pub. No.: WO2014/192906
PCT Pub. Date: Dec. 4, 2014

(65) Prior Publication Data
US 2016/0111724 A1   Apr. 21, 2016

(30) Foreign Application Priority Data

May 31, 2013  (JP) ................................. 2013-116201

(51) Int. Cl.
H01M 4/133 (2010.01)
H01M 4/587 (2010.01)
(Continued)

(52) U.S. Cl.
CPC ........... H01M 4/587 (2013.01); H01M 4/133 (2013.01); H01M 4/134 (2013.01);
(Continued)

(58) Field of Classification Search
CPC .................................................... H01M 4/133
See application file for complete search history.

(56) References Cited

U.S. PATENT DOCUMENTS

2009/0117437 A1*  5/2009  Liu ..................... H01M 4/9083
429/494
2010/0092868 A1  4/2010  Kim et al.
(Continued)

FOREIGN PATENT DOCUMENTS

CN  101399337 A  4/2009
EP  2 760 067 A1  7/2014
(Continued)

OTHER PUBLICATIONS

International Search Report dated Jul. 8, 2014 from the International Bureau in counterpart International Application No. PCT/JP2014/064375.
Supplementary Partial European Search Report dated Oct. 18, 2016, issued from the European Patent Office in counterpart European application No. 14 80 4705.

Primary Examiner — Olatunji Godo
(74) Attorney, Agent, or Firm — Sughrue Mion, PLLC (57) ABSTRACT A method for producing a negative electrode material for lithium ion secondary battery which includes: pressing a mixed liquid comprising particles (B) containing an element capable of occluding/releasing lithium ions, carbon nanotubes (C) of which not less than 95% by number have a fiber diameter of not less than 5 nm and not more than 40 nm, and water into a pulverizing nozzle of a high-pressure dispersing device to obtain a paste or slurry; drying the paste or slurry into a powder; and mixing the powder and carbon particles (A). A negative electrode material for lithium ion secondary battery including carbon particles (A); and flocculates in which particles (B) containing an element capable of occluding/releasing lithium ions and carbon nanotubes (C) of which not less than 95% by number has a fiber diameter of not less than 5 nm and not more than 40 nm are uniformly composited.

12 Claims, 2 Drawing Sheets (51) Int. Cl.
  *H01M 4/1393* (2010.01)
  *H01M 4/38* (2006.01)
  *H01M 4/134* (2010.01)
  *H01M 4/1395* (2010.01)
  *H01M 4/36* (2006.01)
  *H01M 4/46* (2006.01)
  *H01M 4/62* (2006.01)
  *H01M 10/0525* (2010.01)
  *H01M 4/02* (2006.01)

(52) U.S. Cl.
  CPC ....... *H01M 4/1393* (2013.01); *H01M 4/1395* (2013.01); *H01M 4/362* (2013.01); *H01M 4/38* (2013.01); *H01M 4/386* (2013.01); *H01M 4/387* (2013.01); *H01M 4/463* (2013.01); *H01M 4/625* (2013.01); *H01M 10/0525* (2013.01); *H01M 2004/027* (2013.01)

(56) References Cited

U.S. PATENT DOCUMENTS

| | | | |
|---|---|---|---|
| 2011/0163274 A1* | 7/2011 | Plee | H01M 4/134 252/503 |
| 2014/0212762 A1 | 7/2014 | Nakamura et al. | |
| 2014/0272596 A1 | 9/2014 | Yamamoto et al. | |

FOREIGN PATENT DOCUMENTS

| | | |
|---|---|---|
| EP | 2 778 266 A1 | 9/2014 |
| JP | 2004-349164 A | 12/2004 |
| JP | 2005-268120 A | 9/2005 |
| JP | 2006-269110 A | 10/2006 |
| JP | 2012-501515 A | 1/2012 |
| JP | 2012-99341 A | 5/2012 |
| WO | 2010/026332 A1 | 3/2010 |
| WO | WO2012003420 A2 * | 1/2012 |

* cited by examiner

NEGATIVE ELECTRODE MATERIAL FOR LITHIUM ION SECONDARY BATTERY

CROSS REFERENCE TO RELATED APPLICATIONS

This application is a National Stage of International Application No. PCT/JP2014/064375, filed on May 30, 2014, which claims priority from Japanese Patent Application No. 2013-116201, filed on May 31, 2013, the contents of all of which are incorporated herein by reference in their entirety.

TECHNICAL FIELD

The present invention relates to a negative electrode material for lithium ion secondary battery.

In more detail, the present invention relates to a negative electrode material capable of obtaining a lithium ion secondary battery having high initial capacity and a high capacity retention ratio.

BACKGROUND ART

Using particles containing an element capable of occluding/releasing lithium ions such as Si, Sn or the like to obtain a lithium ion secondary battery with a higher capacity has been studied. A theoretical capacity of a lithium ion battery when particles containing, for example, Si are used in a negative electrode material is 4200 mAh/g. Since the theoretical capacity of a lithium battery when metal lithium is used is 3900 mAh/g, if Si or the like can be used in the negative electrode material, it is expected that lithium ion battery having a smaller size and higher capacity than lithium battery can be obtained. However, since the particles containing the element such as Si or the like are low in electric conductivity and have large resistance in occlusion/release of lithium ions, a capacity as high as expected is not obtained. Further, due to repetition of large expansion and contraction accompanying the occlusion/release of the lithium ions, the particles are crushed to become fine particles and electrical connections are disrupted, and the internal resistance increases, thus only lithium ion battery having a short charge/discharge cycle life have been obtained.

CITATION LIST

Patent Literatures

Patent Document 1: JP 2006-269110 A
Patent Document 2: CN 101399337 B
Patent Document 3: JP 2012-501515 B

SUMMARY OF THE INVENTION

Problems to be Resolved by the Invention

A negative electrode material comprising particles containing Si or the like and fibrous carbon has been studied to relax stress accompanying the expansion and contraction companying the occlusion/release of lithium ions. For example, Patent Document 1 discloses metal-graphite composite particles that are formed by applying surface treatment on a dry mixture of natural graphite particles, Si particles, and vapor grown carbon fibers having an average fiber length of 10 μm, with coal-tar pitch. The composite particles are assumed to aim to complement a weak conductive path of the dry mixture of vapor grown carbon fibers and Si particles with a carbon layer formed by the surface treatment.

Patent Document 2 describes a negative electrode active material comprising alloy particles that absorb and release lithium ions and carbon nanotubes having an average fiber diameter of 20 to 40 nm and an average fiber length of 5 to 15 μm. The negative electrode active material is produced by pulverizing and dispersing the alloy particles and the carbon nanotubes by a ball mill. In the pulverization and dispersion process by the ball mill, contamination cannot be avoided, and thus, the safety of the battery may be degraded. Further, the conductive network may not be sufficiently formed because the negative electrode active material is not easy to separate and take out from the medium and the fiber length of the carbon nanotubes are shortened by the pulverization.

Patent Document 3 describes a composite electrode material comprising an electrochemical active element such as Si particles or the like, a binder, carbon nanofibers (CNF) and carbon nanotubes (CNT). The composite electrode material is produced in such a manner that the CNTs are pulverized and dispersed by a ball mill in an aqueous solution of carboxymethylcellulose (CMC), then the electrochemical active element and the CNFs are added to the obtained CNT dispersion liquid and further pulverized by the ball mill. The composite electrode material obtained according to this method is assumed to necessitate a conductive assistant of not less than 12 parts by weight with respect to 100 parts by weight of the active element. An increase in an addition amount of the conductive assistant reduces the capacity per unit weight.

An object of the present invention is to provide a negative electrode material capable of obtaining a lithium ion secondary battery having high initial capacity and a high capacity retention ratio.

Means for Solving the Problems

The present invention including the following aspects has been completed.
(1) A negative electrode material for lithium ion secondary battery comprising:
carbon particles (A); and
flocculates in which particles (B) containing an element capable of occluding/releasing lithium ions and carbon nanotubes (C) of which not less than 95% by number has a fiber diameter of not less than 5 nm and not more than 40 nm are uniformly composited.
(2) The negative electrode material for lithium ion secondary battery according to (1), wherein a number average particle size of primary particles of the particles (B) is not more than 100 nm.
(3) The negative electrode material for lithium ion secondary battery according to (1) or (2), wherein an aspect ratio of the carbon nanotubes (C) is not less than 100.
(4) The negative electrode material for lithium ion secondary battery according to any one of [1] to [3], wherein a ratio of a mass of the particles (B) to a mass of the carbon nanotubes (C) is not less than 1 and not more than 6.
(5) The negative electrode material for lithium ion secondary battery according to any one of (1) to (4), wherein the particles (B) contain at least one element selected from the group consisting of Si, Sn, Ge, Al and In.

(6) A negative electrode material for lithium ion secondary battery comprising:
carbon particles (A);
particles (B) containing an element capable of occluding/releasing lithium ions; and
carbon nanotubes (C) of which not less than 95% by number have a fiber diameter of not less than 5 nm and not more than 40 nm,
wherein the carbon nanotubes (C) are flocculated, and in a flocculated body of the carbon nanotubes (C), the particles (B) are dispersed in a state of primary particles having a number average particle size of not less than 10 nm and not more than 100 nm or in a state of secondary particles having a number average particle size of not less than 10 nm and not more than 1000 nm.
(7) The negative electrode material for lithium ion secondary battery according to any one of (1) to (6), wherein not less than 95% by number of the particles (B) in the negative electrode material have a particle size of not less than 10 nm and not more than 400 nm.
(8) A lithium ion secondary battery comprising the negative electrode material for lithium ion secondary battery according to any one of (1) to (7).
(9) A method for producing the negative electrode material for lithium ion secondary battery according to any one of (1) to (7) comprising the steps of:
pressing a mixed solution comprising the particles (B) containing an element capable of occluding/releasing lithium ions; the carbon nanotubes (C) of which not less than 95% by number have a fiber diameter of not less than 5 nm and not more than 40 nm; and water into a pulverizing nozzle of a high-pressure dispersing device to obtain a paste or a slurry; drying the paste or the slurry into a powder; and mixing the powder and the carbon particles (A).

Advantageous Effects of the Invention

The negative electrode material according to one embodiment of the invention is excellent in the effect of largely reducing electrode resistance and of suppressing expansion and contraction. When the negative electrode material according to one embodiment of the invention is used to produce an electrode for a lithium ion battery, battery characteristics such as energy density, initial capacity, capacity retention ratio and the like are improved.

EMBODIMENTS FOR CARRYING OUT THE INVENTION

A negative electrode material for lithium ion secondary battery according to one embodiment of the present invention comprises carbon particles (A), and flocculates in which particles (B) and carbon nanotubes (C) are uniformly composited.
(Carbon Particles (A))
The carbon particles (A) used in the present invention are particles composed of a carbon material that are capable of occluding/releasing lithium ions. As the carbon material, a graphitic carbon material such as an artificial graphite, a pyrolytic graphite, an expanded graphite, a natural graphite, a flaky graphite, a scale-like graphite or the like; or a poorly crystalline carbonaceous carbon material such as a graphitizable carbon, a non-graphitizable carbon, a glassy carbon, an amorphous carbon, a low-temperature calcined carbon or the like can be used. Among these, preferred are, as the carbon particles (A), those comprising a graphitic carbon material, those comprising graphite particles and carbonaceous carbon layers, those comprising carbon coated graphite particles which carbon fibers are bound onto, and those comprising a poorly crystalline carbonaceous carbon material.

The carbon particles (A) have a 50% particle size ($D_{50}$) in a volume cumulative particle size distribution of preferably not less than 2 μm and not more than 40 μm, more preferably not less than 2 μm and not more than 30 μm, and still more preferably not less than 3 μm and not more than 20 μm. As for the carbon particles, which have a high number of fine particles, it is difficult to raise the electrode density. By contrast, when large particles are high in number, there is a tendency in which the output characteristics degrade because a diffusion distance of lithium ions in the solid becomes longer. From these facts, the carbon particles (A) are preferable for not less than 90% (on a number basis) to have a particle size of not less than 1 μm and not more than 50 μm and more preferable for not less than 90% to have a particle size of not less than 5 μm and not more than 50 μm. Further, in the carbon particles (A), a 10% particle size ($D_{10}$) in the volume cumulative particle size distribution is preferably not less than 1 μm, and more preferably not less than 2 μm. Note that the particle size distribution of the carbon particles (A) is measured by a laser diffraction particle size distribution analyzer. The particle size distribution is measured and obtained without discriminating between primary particles and secondary particles.

The carbon particles (A) used in the present invention are preferably graphite particles and more preferably artificial graphite particles. The graphite particles have a $d_{002}$ preferably of not more than 0.337 nm and more preferably of not more than 0.336 nm. Further, the graphite particles have an $L_c$ preferably of not less than 50 nm and more preferably of not less than 50 nm and not more than 100 nm. $d_{002}$ refers to the value of the interplanar spacing determined from a 002 diffraction line measured by powder X-ray diffraction, and $L_C$ refers to the size of crystallite in the c axis direction determined from a 002 diffraction line in the powder X-ray diffraction.

Further, the carbon particles (A) used in the present invention have a BET specific surface area preferably of not less than 1 $m^2/g$ and not more than 10 $m^2/g$, and more preferably of not less than 1 $m^2/g$ and not more than 7 $m^2/g$.

Artificial graphite particles can use a coal-derived coke and/or a petroleum-derived coke as a raw material. The artificial graphite particles are preferably those formed by heat-treating the coal-derived coke and/or the petroleum-derived coke at a temperature preferably of not less than 2000° C. and more preferably of not less than 2500° C. There is no particular limitation for the upper limit of the heat treatment temperature, but it is preferably 3200° C. This heat treatment is preferably performed under an inert atmosphere. In the heat treatment, a conventional Acheson graphitization furnace or the like can be used.
(Particles (B))
The particles (B) used in the present invention comprise a material containing an element capable of occluding and releasing lithium ions. As a matter of course, the particles (B) refer to those other than the carbon particle (A). As preferred elements contained in the particles (B), Sb, Pb, Ag, Mg, Zn, Ga, Bi, Si, Sn, Ge, Al, In or the like can be mentioned. Among these, Si, Sn, Ge, Al, or In is preferred, and Si is preferred in view of thermal resistance. The particles (B) may be formed of simple substance, a compound, a mixture, an eutectic material or a solid solution containing at least one of the above elements. Further, the particles (B) may be aggregates of primary particles, that is, secondary particles. As a shape of the particles (B), a massive form, a scale-like form, a spherical form, a fibrous form or the like can be mentioned. Among these, the spherical form or the massive form is preferred.

As materials containing an Si element, those represented by the general formula: $M^a_m Si$ can be mentioned. The above material is a compound, a mixture, a eutectic material or a solid solution comprising an element $M^a$ in a ratio of m mol relative to 1 mol of Si. $M^a$ is an element other than Li. Specifically, examples of $M^a$ include Si, B, C, N, O, S, P, Na, Mg, Al, K, Ca, Ti, V, Cr, Mn, Fe, Co, Ni, Cu, Zn, Mo, Ru, Rh, Pd, Pt, Be, Nb, Nd, Ce, W, Ta, Ag, Au, Cd, Ga, In, Sb, Ba or the like. Note that in a case where $M^a$ is Si, the material means Si elementary substance. In the formula, m is preferably not less than 0.01, more preferably not less than 0.1, and even more preferably not less than 0.3.

Specific examples of the materials containing an Si element include an Si elementary substance, alloys of Si and an alkaline earth metal; alloys of Si and a transition metal; alloys of Si and a metalloid; solid solution alloys or eutectic alloys of Si and Be, Ag, Al, Au, Cd, Ga, In, Sb or Zn; silicides such as CaSi, $CaSi_2$, $Mg_2Si$, $BaSi_2$, $Cu_5Si$, FeSi, $FeSi_2$, $CoSi_2$, $Ni_2Si$, $NiSi_2$, MnSi, $MnSi_2$, $MoSi_2$, $CrSi_2$, $Cr_3Si$, $TiSi_2$, $Ti_5Si_3$, $NbSi_2$, $NdSi_2$, $CeSi_2$, $WSi_2$, $W_5Si_3$, $TaSi_2$, $Ta_5Si_3$, PtSi, $V_3Si$, $VSi_2$, PdSi, RuSi, RhSi or the like; $SiO_2$, SiC, $Si_3N_4$ or the like.

As materials containing an Sn element, tin elementary substance, tin alloys, tin oxides, tin sulfides, tin halides, stannides and the like can be mentioned. Specific examples of the materials containing an Sn element include alloys of Sn and Zn, alloys of Sn and Cd, alloys of Sn and In, alloys of Sn and Pb; tin oxides such as SnO, $SnO_2$, $M^b_4SnO_4$ ($M^b$ represents a metal element other than Sn) or the like; tin sulfides such as SnS, $SnS_2$, $M^b_2SnS_3$ ($M^b$ represents a metal element other than Sn) or the like; tin halides such as $SnX_2$, $SnX_4$, $M^bSnX_4$ ($M^b$ represents a metal element other than Sn. X represents a halogen atom) or the like; stannides such as MgSn, $Mg_2Sn$, FeSn, $FeSn_2$, MoSn, $MoSn_2$ or the like can be mentioned.

The particles (B) are preferably oxidized at the surfaces thereof. This oxidation may be due to natural oxidation or artificial oxidation. The particles (B) are covered with a thin oxide film by this oxidation.

The particles (B) have a lower limit of a number average particle size of primary particles of preferably 5 nm, more preferably 10 nm, and still more preferably 30 nm, and an upper limit of the number average particle size of primary particles of preferably 1000 nm, more preferably 500 nm, and still more preferably 100 nm.

The particles (B) in a raw material state are usually a mixture of primary particles and aggregates (that is, secondary particles) of the primary particles. The particles (B) in a raw material state may each have a peak in the range of 0.1 μm to 1 μm and in the range of 10 μm to 100 μm in a number basis particle size distribution. Further, the 50% particle size (D50) in a number cumulative particle size distribution of the particles (B) in a raw material state is preferably from 1/200 to 1/10, and more preferably from 1/100 to 1/20 relative to the 50% particle size in the volume cumulative particle size distribution of the carbon particles (A) in a raw material state. The 50% particle size is a value calculated from a cumulative particle size distribution obtained by measuring without discriminating between the primary particles and secondary particles.

In the negative electrode material of the present invention, the particles (B) are preferably dispersed in a flocculated body of carbon nanotubes (C) described below in a state of primary particles having a number average particle size of not less than 10 nm and not more than 100 nm or in a state of secondary particles having a number average particle size of not less than 10 nm and not more than 1000 nm. Further, not less than 95% (on a number basis) of the particles (B) in the negative electrode material preferably have a particle size of not less than 10 nm and not more than 400 nm. Note that the particle size distribution of the particles (B) is obtained by measuring without discriminating between the primary particles and secondary particles.

The amount of the particles (B) is preferably not less than 1 part by mass and not more than 100 parts by mass, more preferably not less than 3 parts by mass and not more than 50 parts by mass, and still more preferably not less than 5 parts by mass and not more than 30 parts by mass with respect to 100 parts by mass of the carbon particles (A).

(Carbon Nanotubes (C))

The carbon nanotubes (C) used in the present invention have a fiber diameter of, in not less than 95% (on a number basis) thereof, not less than 5 nm and not more than 40 nm, preferably not less than 5 nm and not more than 40 nm, more preferably not less than 7 nm and not more than 20 nm, and further preferably not less than 9 nm and not more than 15 nm. There is a tendency that carbon nanotubes having a small fiber diameter are difficult to be disentangled one by one in order to disperse. There is a tendency that it is difficult to produce carbon nanotubes (C) having a large fiber diameter by a supported catalyst method.

Examples of the carbon nanotubes (C) used in the present invention include those having a tubular structure in which graphene sheets comprising carbon six membered rings are rolled parallel to the fiber axis, those having a platelet structure in which graphene sheets are perpendicularly arranged to the fiber axis, and those having a herringbone structure in which graphene sheets are rolled with an oblique angle to the fiber axis. Among these, carbon nanotubes with a tubular structure are preferred in view of electric conductivity and mechanical strength.

The aspect ratio of carbon nanotubes (C) as a raw material is preferably not less than 100 and not more than 1000, more preferably not less than 400 and not more than 1000. When the aspect ratio is small, the degree of entanglement between the fibers may be weak, and it tends to be difficult to form an effective conductive network. When the aspect ratio is large, there is a tendency that the degree of entanglement between fibers is strong, and dispersion may often be difficult.

Further, the carbon nanotubes (C) in the negative electrode material for lithium ion secondary battery have an aspect ratio of preferably not less than 100, more preferably not less than 200, and even more preferably not less than 400. Note that the upper limit of the aspect ratio of the carbon nanotubes in the negative electrode material for lithium ion secondary battery is not particularly limited, but is preferably not more than 1000 in view of dispersion efficiency and the like. In the present invention, the aspect ratio is a ratio of an average fiber length of the carbon nanotubes to an average fiber diameter of the carbon nanotubes.

The BET specific surface area of the carbon nanotubes (C) is preferably not less than 150 m²/g and not more than 300 m²/g, more preferably not less than 240 m²/g and not more than 280 m²/g, and still more preferably not less than 250 m²/g and not more than 270 m²/g.

Further, the $C_0$ value of the carbon nanotubes is preferably not less than 0.680 nm and not more than 0.690 nm. When the $C_0$ value of the carbon nanotubes is small, the carbon nanotubes lose flexibility and aggregates may often be difficult to be disentangled. The $C_0$ is a lattice constant. The lattice constant corresponds to a value obtained by doubling an interplanar spacing d calculated from X-ray diffraction.

The oxidation starting temperature of the carbon nanotubes (C) is preferably not less than 400° C. and not more than 550° C. Here, the oxidation starting temperature is a temperature at which the weight is decreased by 0.1% relative to the initial weight (the charge in amount) when heated to 1000° C. at 10° C./min under air flow in a thermobalance. A lower oxidation starting temperature tends to cause more defects in carbon crystals.

The carbon nanotubes (C) have a compressed specific resistance of preferably not less than 0.014 Ω·cm and not more than 0.020 Ω·cm at the compressed density of 0.8 g/cm³. Carbon nanotubes with small compressed specific resistance tend to have low flexibility while carbon nanotubes with large compressed specific resistance tend to have a low electric conductivity imparting effect.

Multi-walled carbon nanotubes (C) used in the present invention are not particularly limited by synthesis methods thereof, but are preferably synthesized by vapor phase growth methods. Among the vapor phase growth methods, those synthesized by a supported catalyst method are preferred.

The supported catalyst method is a method in which carbon fibers are manufactured by reacting a carbon source in the vapor phase using a catalyst where catalytic metals are supported on inorganic carriers.

Examples of the inorganic carriers include alumina, magnesia, silicatitania, calcium carbonate and the like. The inorganic carriers are preferably in a powdery form. Examples of the catalytic metals include iron, cobalt, nickel, molybdenum, vanadium and the like. Supporting can be performed by impregnating a carrier with a solution comprising a compound comprising a catalytic metal element; by co-precipitation of a solution comprising a compound comprising a catalytic metal element and a compound comprising an element that constitutes an inorganic carrier; or by other known methods of supporting.

Examples of the carbon sources include methane, ethylene, acetylene and the like. The reaction can be performed in a reaction vessel such as a fluidized bed, a moving bed, or a fixed bed. The temperature during the reaction is preferably set at 500° C. to 800° C. A carrier gas can be used in order to feed the carbon source to the reaction vessel. Examples of the carrier gas include hydrogen, nitrogen, argon or the like. A reaction time is preferably for 5 to 120 minutes.

In the negative electrode material according to one embodiment of the present invention, flocculates in which the particles (B) and the carbon nanotubes (C) are homogeneously composited are formed. The flocculates cannot be obtained by simply mixing in a dry state. The flocculate is preferably a flocculated body. The flocculated body is in a state of a fluffy cluster, or in a floaty flocculation state. When the flocculated body is formed, the viscosity of a liquid containing the flocculated body usually becomes higher. Further, when a network is formed over an entire liquid, that is, when a fluffy block having the same volume as the entire liquid is formed, a state that is near a gel state and that does not precipitate at all is formed. A ratio of a mass of the particles (B) to a mass of the carbon nanotubes (C) is preferably not less than 1 and not more than 6.

The flocculates can be obtained, for example, by the following method. First, the particles (B) and the carbon nanotubes (C) are added to and mixed with pure water to obtain a mixed liquid. A solid content of the mixed liquid (a concentration of the particles (B) and the carbon nanotubes (C)) is preferably not more than 5% by mass. This is because when the solid content exceeds 5% by mass, there is a tendency that the viscosity of the mixed liquid is too high and it is difficult to efficiently disentangle the carbon nanotube aggregates. Note that the use of a dispersing agent in the mixed liquid is not preferred. The dispersing agent may impart a disadvantageous effect on the battery characteristics. Further, it is difficult to remove the dispersing agent added to the mixed liquid from the negative electrode material. When the mixed liquid is left to rest for several minutes, the particles (B) and the carbon nanotubes (C) are separated from pure water.

Next, the mixed liquid is pressed using a pump into a grinding nozzle of a high-pressure dispersing device to obtain a paste or slurry. As the mixed liquid passes through the nozzle at ultrahigh-speed, strong shear force is generated by turbulence, and due to this shear force and the cavitation effect, the aggregates of the carbon nanotubes (C) are disentangled and homogeneously composited with the particles (B). The paste or slurry obtained by treating the mixed liquid by high-pressure dispersion has remarkably high viscosity and does not separate by leaving to rest. This brings about the assumption that the carbon nanotubes (C) form a network in the paste or slurry.

Examples of the high-pressure dispersing device include, for example, Nanovater manufactured by Yoshida Kikai Co., Ltd., Nanomaker manufactured by Advanced Nano Technology Co., Ltd., and the like. An injection pressure to the nozzle is preferably not less than 100 MPa and not more than 250 MPa. Further, the number of injections/passages of the liquid to/through the nozzle is preferably not more than 5 times. More than 5 injections/passages tends to cause fiber fragmentation and coagulation of the carbon nanotubes.

Next, the resulting paste or slurry is dried into a powder. Examples of drying methods include spray drying, freeze drying, drum drying, through-flow drying, hot-air drying, vacuum drying and the like. A drying temperature is suitably selected depending on the type of drying device. Drying is preferably performed until the water content becomes 0.5% by mass or less as measured with the Karl Fischer method. After drying, disintegration is preferably performed as desired. For methods of disintegration, a pulverizer using the force of impact of a hammer or the like, a jet mill using mutual collisions of a material to be disintegrated, or the like is preferred.

According to the above method, flocculates in which the particles (B) and the carbon nanotubes (C) are homogeneously composited can be obtained. The particles (B) come into contact with a surface of the carbon nanotubes (C) and the carbon nanotubes (C) have a structure bridging over a plurality of the particles (B). Further, since a space between the carbon nanotubes (C) can absorb expansion and contraction of the particles (B) accompanying the charge/discharge, a conductive passage between the particles (B) and the carbon nanotubes (C) can be maintained.

The negative electrode material for lithium ion secondary battery according to one embodiment of the present invention is not limited in its form as long as the carbon particles (A) and the flocculates described above are contained. The negative electrode material for lithium ion secondary battery according to one embodiment of the present invention may be, for example, that obtained by homogeneously mixing the carbon particles (A) and the flocculates comprising the particles (B) and the carbon nanotubes (C) using a mixer that can apply a shearing force such as a planetary centrifugal mixer (for example, those manufactured by Thinky Co., Ltd.) or the like. Further, the negative electrode material may be formed in the state of a paste or slurry, as is described later.

The negative electrode material for lithium ion secondary battery according to one embodiment of the present invention may be comprised in an electrode sheet. The electrode sheet usually comprises a current collector, and an electrode layer coated on the current collector. The negative electrode material for lithium ion secondary battery according to one embodiment of the present invention is usually comprised in the relevant electrode layer.

Examples of current collectors include a nickel foil, a copper foil, a nickel mesh, a copper mesh or the like. Further, the current collector may comprise an electric conductive metal foil and an electric conductive layer coated on the electric conductive metal foil. As the electric conductive layer, those composed of a conductivity-imparting agent such as conductive carbon particles and a binder can be mentioned.

The electrode layer may further comprise a binder or a thickener in addition to the negative electrode material for lithium ion secondary battery according to one embodiment of the present invention. Examples of the thickener include water soluble resins such as carboxymethylcellulose (CMC, manufactured by, for example, Daicel FineChem Ltd.). Examples of the binder include polyethylene, polypropylene, ethylene-propylene terpolymer, butadiene rubber, styrene butadiene rubber (SBR, for example, aqueous dispersion manufactured by Zeon Corporation), butyl rubber, acrylic rubber, high molecular weight compounds with large ionic conductivity, and the like. Examples of high molecular weight compounds with large ionic conductivity include polyvinylidene fluoride, polyethylene oxide, polyepichlorohydrin, polyphosphazene, polyacrylonitrile, or the like. The amount of the binder is preferably 0.5 to 100 parts by mass relative to 100 parts by mass of a total of the carbon particles (A), the particles (B) and the carbon nanotubes (C).

The electrode layer can be obtained, for example, by applying and drying the paste or slurry comprising the negative electrode material on the current collector. The paste or slurry can be obtained, for example, by kneading the negative electrode material, the binder and/or thickener, and, if desired, a solvent. When doing this, the carbon particles (A) are crushed and dispersed in the negative electrode material, and a conductive network tends to be uniformly and three-dimensionally formed in the negative electrode material. The paste or slurry can be fabricated into a form such as a sheet-like form or a pellet-like form.

There is no particular limitation for the solvent, and N-methyl-2-pyrrolidone, dimethylformamide, isopropanol, water, or the like can be mentioned. In the case of the binder when water is used as the solvent, a thickener is preferably used in combination. The amount of the solvent is regulated such that the paste or slurry has a viscosity at which application onto the current collector is easily performed.

There is no particular limitation for the method of applying the paste or slurry comprising the negative electrode material onto the current collector. A thickness of the electrode layer is usually 50 to 200 µm. In a case where the thickness of the electrode layer is too large, the electrode sheet may not be accommodated in a standardized battery housing. The thickness of the electrode layer can be modulated by the application amount of the paste or slurry. It can also be modulated by performing pressure forming after drying the paste or slurry. Examples of the pressure forming method include roll pressing, plate pressing or the like.

(Lithium Ion Battery)

The lithium ion battery according to one embodiment of the present invention comprises at least one selected from the group consisting of a nonaqueous electrolytic solution and a nonaqueous polymer electrolyte; a positive electrode sheet; and a negative electrode sheet. For the negative electrode sheet, an electrode sheet comprising the negative electrode material according to one embodiment of the present invention may be used.

For a positive electrode sheet used in the present invention, those traditionally used for lithium ion battery, for example, those comprising a current collector and an electrode layer comprising a positive electrode active material coated on the current collector can be mentioned. As the positive electrode active material, one or two or more types can be appropriately selected from materials (materials capable of occluding/releasing lithium ions) well-known as positive electrode active materials in lithium ion battery. Among these, lithium-containing metal oxides capable of occluding and releasing lithium ions are preferable. As the lithium-containing metal oxide, composite oxides comprising a lithium element and at least one element selected from the group consisting of Co, Mg, Cr, Mn, Ni, Fe, Al, Mo, V, W Ti or the like can be mentioned. Specific examples of the positive electrode active material include $LiNiO_2$, $LiCoO_2$, $LiMn_2O_4$, $LiNi_{0.34}Mn_{0.33}Co_{0.33}O_2$, $LiFePO_4$, and the like.

There is no particular limitation for the nonaqueous electrolytic solution and nonaqueous polymer electrolyte used for lithium ion battery. Examples include an organic electrolytic solution in which a lithium salt such as $LiClO_4$, $LiPF_6$, $LiAsF_6$, $LiSO_3CF_3$, $CH_3SO_3Li$, $CF_3SO_3Li$ or the like is dissolved in a nonaqueous solvent such as ethylene carbonate, diethyl carbonate, dimethyl carbonate, ethyl methyl carbonate, propylene carbonate, butylene carbonate, acetonitrile, propyronitrile, dimethoxyethane, tetrahydrofuran, γ-butyrolactone or the like; a gel-like polymer electrolyte containing polyethylene oxide, polyacrylonitrile, polyvinylidene fluoride, polymethyl methacrylate or the like; and a solid-like polymer electrolyte containing a polymer having an ethylene oxide bond or the like.

Moreover, a small amount of a material which undergoes a decomposition reaction when a lithium ion battery is charged for the first time may be added to the electrolytic solution. Examples of the above material include vinylene carbonate (VC), biphenyl, propane sultone (PS), fluoroethylene carbonate (FEC), ethylene sulfite (ES) or the like. The addition amount thereof is preferably 0.01 to 30% by mass.

A separator can be placed between the positive electrode sheet and the negative electrode sheet in the lithium ion battery according to the present invention. Examples of the separators include a non-woven fabric, a cloth, or a microporous film, or combinations thereof or the like, which comprises polyolefin such as polyethylene, polypropylene or the like as a main component.

EXAMPLES

Examples of the present invention are shown below, by which the present invention will be described in further detail. The following examples are only illustrations for explanation and the present invention is not at all limited by these examples.

Performance evaluation of the negative electrode materials and the battery obtained therewith was carried out according to the following manners.

(SEM (Scanning Electron Microscope) Observation)

Using a JEOL Quick Auto Coater, a surface of a sample was sputtered with platinum at a PRESET of 20. Then, using a JEOL FE-SEM (JSM-7600F), SEM observation was performed with the column mode set to SEI (accelerating voltage: 5.0 kV).

(Evaluation of Charge/Discharge Characteristics)

The following operations were conducted inside a glove box in which a dry argon gas atmosphere with a dew point of not more than −80° C. was maintained.

A 2320-type coin cell (diameter: 23 mm, thickness: 20 mm) was prepared. A piece of lithium foil having a diameter of 17.5 mm and a thickness of 1 mm was introduced in a coin cell cap. Then, an electrolytic solution was injected into the coin cell. Then, a separator and a negative electrode sheet were placed in this order. Then, the coin cell casing was hermetically crimped with the coin cell cap to obtain a lithium ion battery for evaluation. Note that, as the electrolytic solution, used was a liquid obtained by dissolving an electrolyte $LiPF_6$ at a concentration of 1.0 mol/L in a solvent in which ethylene carbonate, ethyl methyl carbonate, and diethyl carbonate are mixed at a ratio of 3:5:2 by volume.

Constant current charge was performed on the lithium ion battery for evaluation from the rest potential to 5 mV at 0.2 mA/cm$^2$. Then, constant current discharge was performed at 0.2 mA/cm$^2$, and cut off at 1.5 V. With this charge and discharge operation as 1 cycle, 20 cycles were performed. A charge capacity and a discharge capacity at the first cycle were measured. Note that the capacity is a value for a total weight of the carbon particles (A) and the particles (B).

Example 1

With 1960 parts by mass of pure water and a stirring bar fed into a beaker, the beaker was placed on a magnetic stirrer. Into the pure water, 32.1 parts by mass of the particles (B) (Si particles, manufactured by Aldrich, average particle size of primary particles: not more than 100 nm) and 7.9 parts by mass of the carbon nanotubes (C) (vapor grown carbon fibers, manufactured by Showa Denko K. K., average fiber diameter: 12 nm) were fed and stirred for 5 minutes to obtain a mixed liquid. The mixed liquid was fed into a tank of Nanovater manufactured by Yoshida Kikai Co., Ltd. The mixed liquid in the tank was transferred to a slurry pump using a pressure-feed pump and pressed into a straight nozzle (nozzle diameter: 190 μm) under 150 MPa by the slurry pump to perform a high-pressure dispersion process. Thus, a highly viscous slurry was obtained.

The obtained slurry was filtered under reduced pressure to obtain a cake-like solid material. The cake-like solid material was fed into a porcelain dish and dried for 9 hours using a hot-air dryer set at 150° C. The obtained dried material was disintegrated by a juicer mixer for 1 minute and the flocculated body comprising the particles (B) and carbon nanotubes (C) was obtained.

Figure 1:
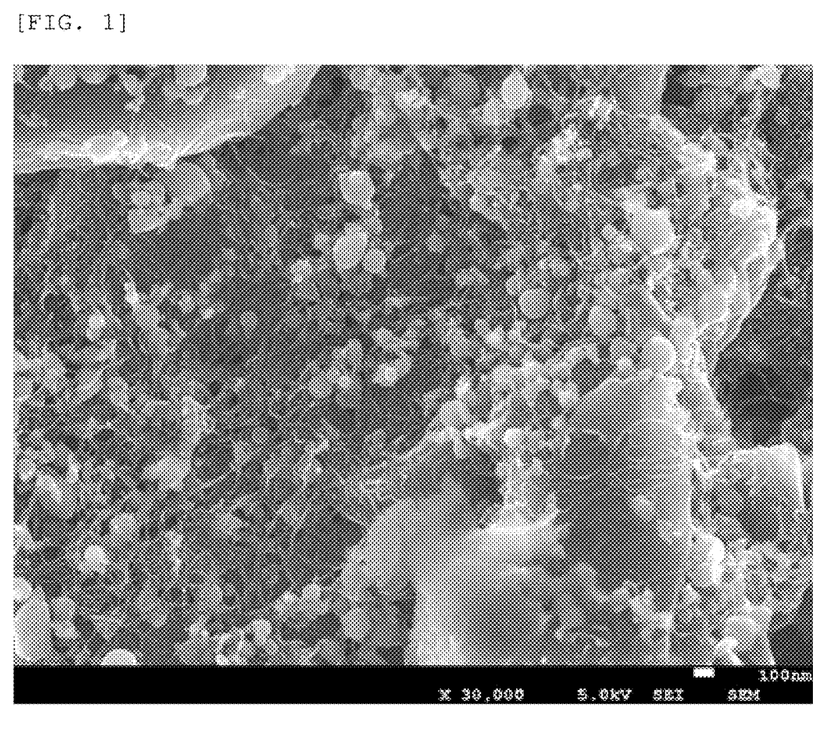
FIG. 1 A drawing that shows an electron micrograph of a negative electrode sheet obtained according to Example 1.

Next, 84.3 parts by mass of carbon particles (A) (SCMG (registered trade mark) AF, manufactured by Showa Denko K. K.), 11.7 parts by mass of the flocculated body comprising the particles (B) and the carbon nanotubes (C), a gel-like aqueous solution containing 2 parts by mass of carboxymethylcellulose (CMC), and an aqueous dispersion liquid containing 2 parts by mass of styrene butadiene rubber (SBR) were mixed. The mixture was kneaded using a planetary centrifugal mixer (manufactured by Thinky Co., Ltd.) to prepare a negative electrode slurry. The negative electrode slurry was coated on a copper foil and vacuum dried so as to have a dry thickness of 100 μm. A piece of sheet having a diameter of 16 mm was punched out from the resulting sheet. The piece of sheet was vacuum dried at 50° C. for 12 hours to obtain a negative electrode sheet. A surface of the negative electrode sheet was photographed under the SEM at a magnification of 30 k times. One example of the SEM micrograph of the negative electrode sheet is shown in FIG. 1. Not less than 95% (on a number basis) of the particles (B) on the SEM micrograph had a particle size of not less than 10 nm and not more than 400 nm. The carbon nanotubes (C) on the SEM micrograph were in a state of flocculation. The particles (B) and the carbon nanotubes (C) were homogeneously composited. A charge capacity, a discharge capacity, and an initial efficiency that is a ratio thereof, at the first cycle of a lithium ion battery for evaluation which was obtained using the negative electrode sheet, are shown in Table 1.

Example 2

A flocculated body comprising the particles (B) and the carbon nanotubes (C) was obtained in the same manner as that of Example 1 except that the amount of the particles (B) was changed to 28.1 parts by mass and the amount of the carbon nanotubes (C) was changed to 11.9 parts by mass. Then, a negative electrode sheet was obtained in the same manner as that of Example 1 except that the amount of the carbon particles (A) was changed to 82.9 parts by mass and the amount of the flocculated body comprising the particles (B) and the carbon nanotubes (C) was changed to 13.1 parts by mass. The surface of the negative electrode sheet was photographed under the SEM at a magnification of 30 k times. Not less than 95% (on a number basis) of the particles (B) on the SEM micrograph had a particle size of not less than 10 nm and not more than 400 nm. The carbon nanotubes (C) on the SEM micrograph were in a state of flocculation. A charge capacity, a discharge capacity, and an initial efficiency that is a ratio thereof, at the first cycle of a lithium ion battery for evaluation which was obtained using the negative electrode sheet, are shown in Table 1.

Comparative Example 1

86.4 parts by mass of the carbon particles (A) and 9.6 parts by mass of the particles (B) were dry mixed. The mixture was mixed with a gel-like aqueous solution containing 2 parts by mass of carboxymethylcellulose (CMC) and an aqueous dispersion liquid containing 2 parts by mass of styrene butadiene rubber (SBR). A negative electrode sheet was obtained in the same manner as that of Example 1 except that the mixture was kneaded using the planetary centrifugal mixer to prepare a negative electrode slurry. A charge capacity, a discharge capacity, and an initial efficiency that is a ratio thereof, at the first cycle of a lithium ion battery for evaluation which was obtained using the negative electrode sheet, are shown in Table 1.

Comparative Example 2

Figure 2:
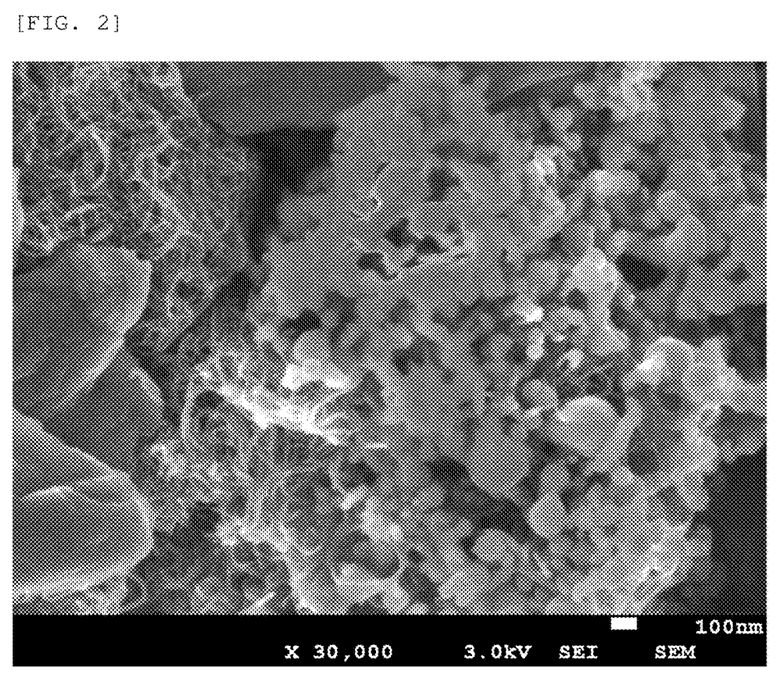
FIG. 2 A drawing that shows an electron micrograph of a negative electrode sheet obtained according to Comparative Example 2.

84.3 parts by mass of the carbon particles (A), 9.4 parts by mass of the particles (B), and 2.3 parts by mass of the carbon nanotubes (C) were dry mixed. The mixture was mixed with a gel-like aqueous solution containing 2 parts by mass of carboxymethylcellulose (CMC) and an aqueous dispersion liquid containing 2 parts by mass of styrene butadiene rubber (SBR). A negative electrode sheet was obtained in the same manner as that of Example 1 except that the mixture was kneaded using the planetary centrifugal mixer to prepare a negative electrode slurry. The surface of the negative electrode sheet was photographed under the SEM at a magnification of 30 k times. One example of the SEM micrograph of the negative electrode sheet is shown in FIG. 2. The carbon nanotubes (C) on the SEM micrograph had portions in which the entanglement is not partially disentangled and a coagulum is formed (thread ball-like object on the upper left of FIG. 2). The particles (B) on the SEM micrograph had portions in which a large aggregate is formed, and those having a particle size of not less than 10 nm and not more than 400 nm were less than 90% (on a number basis). A charge capacity, a discharge capacity, and an initial efficiency that is a ratio thereof, at the first cycle of a lithium ion battery for evaluation which was obtained using the negative electrode sheet, are shown in Table 1.

Comparative Example 3

82.9 parts by mass of the carbon particles (A), 9.2 parts by mass of the particles (B), and 3.9 parts by mass of the carbon nanotubes (C) were dry mixed. The mixture was mixed with a gel-like aqueous solution containing 2 parts by mass of carboxymethylcellulose (CMC) and an aqueous dispersion liquid containing 2 parts by mass of styrene butadiene rubber (SBR). A negative electrode sheet was obtained in the same manner as that of Example 1 except that the mixture was kneaded using the planetary centrifugal mixer to prepare a negative electrode slurry. The carbon nanotubes (C) on the SEM micrograph had portions in which the entanglement is not partially disentangled and a coagulum is formed. The particles (B) on the SEM micrograph had portions in which a large aggregate is formed, and those having a particle size of not less than 10 nm and not more than 400 nm were less than 90% (on a number basis). A charge capacity, a discharge capacity, and an initial efficiency that is a ratio thereof, at the first cycle of a lithium ion battery for evaluation which was obtained using the negative electrode sheet, are shown in Table 1.

was changed to 20 parts by mass and the amount of the carbon nanotubes (C) was changed to 20 parts by mass. Then, a negative electrode sheet was obtained in the same manner as that of Example 1 except that the amount of the carbon particles (A) was changed to 78.6 parts by mass and the amount of the flocculated body comprising the particles (B) and the carbon nanotubes (C) was changed to 17.4 parts by mass. The surface of the negative electrode sheet was photographed under the SEM at a magnification of 30 k times. Not less than 95% (on a number basis) of the particles (B) on the SEM micrograph had a particle size of not less than 10 nm and not more than 400 nm. The carbon nanotubes (C) on the SEM micrograph were in a state of flocculation. A charge capacity, a discharge capacity and an initial efficiency that is a ratio thereof at the first cycle of a lithium ion battery for evaluation, which was obtained using the negative electrode sheet, are shown in Table 2.

Comparative Example 4

78.6 parts by mass of the carbon particles (A), 8.7 parts by mass of the particles (B), and 8.7 parts by mass of the carbon nanotubes (C) were dry mixed. The mixture was mixed with a gel-like aqueous solution containing 2 parts by mass of carboxymethylcellulose (CMC) and an aqueous dispersion liquid containing 2 parts by mass of styrene butadiene rubber (SBR). A slurry for negative electrodes was prepared by kneading the mixture using the planetary centrifugal mixer. A negative electrode sheet was obtained in the same manner as that of Example 1 except that the slurry for negative electrodes was used. The carbon nanotubes (C) on the SEM micrograph had portions in which the entanglement is not partially disentangled and a coagulum is formed. The particles (B) on the SEM micrograph had portions in which a large aggregate is formed, and those having a particle size of not less than 10 nm and not more than 400 nm were less than 90% (on a number basis). A charge capacity, a discharge capacity, and an initial efficiency that is a ratio thereof, at the first cycle of a lithium ion battery for evaluation which was obtained using the negative electrode sheet, are shown in Table 2.

Comparative Example 5

A gel-like aqueous solution containing 2 parts by mass of carboxymethylcellulose (CMC) was added to 9.2 parts by

TABLE 1

|  |  | Comp. Ex. 1 | Ex. 1 | Comp. Ex. 2 | Ex. 2 | Comp. Ex. 3 |
|---|---|---|---|---|---|---|
| Carbon particle (A) | Parts by mass | 86.4 | 84.3 | 84.3 | 82.9 | 82.9 |
| Particle (B) | Parts by mass | 9.6 | 9.4 | 9.4 | 9.2 | 9.2 |
| CNT (C) | Parts by mass | 0.0 | 2.3 | 2.3 | 3.9 | 3.9 |
| CNF (D) | Parts by mass | 0.0 | 0.0 | 0.0 | 0.0 | 0.0 |
| CMC | Parts by mass | 2.0 | 2.0 | 2.0 | 2.0 | 2.0 |
| SBR | Parts by mass | 2.0 | 2.0 | 2.0 | 2.0 | 2.0 |
| Particle (B).CNT (C) Manner of Mixing |  | — | High-Pressure Dispersing | Dry Mixing | High-Pressure Dispersing | Dry Mixing |
| (B)/(C) mass ratio |  | — | 4.09 | 4.09 | 2.36 | 2.36 |
| (B) – (C) State |  |  | Flocculated | Aggregated | Flocculated | Aggregated |
| Charge capacity | mAh/g | 465.5 | 636.4 | 581.3 | 753.4 | 630.0 |
| Discharge capacity | mAh/g | 289.6 | 543.4 | 483.5 | 611.0 | 491.7 |
| Initial efficiency | % | 62.2 | 85.4 | 83.2 | 81.1 | 78.0 |

Example 3

A flocculated body comprising the particles (B) and the carbon nanotubes (C) was obtained in the same manner as that of Example 1 except that the amount of the particles (B)

mass of the particles (B) and 3.9 parts by mass of the carbon nanotubes (C), the mixture was processed by a ball mill at 700 rpm for 15 hours to obtain an aqueous dispersion liquid. The dispersion liquid was mixed with an aqueous dispersion liquid containing 2 parts by mass of styrene butadiene rubber (SBR), and 82.9 parts by mass of the carbon particles (A). The resulting mixture was kneaded using the planetary centrifugal mixer to prepare a negative electrode slurry. A negative electrode sheet was obtained in the same manner as that of Example 1 except that the negative electrode slurry was used. In the carbon nanotubes (C) on the SEM micrograph, the entanglement was not partially disentangled, and a coagulum was formed. The particles (B) on the SEM micrograph had portions in which large aggregates were formed, and those having a particle size of 10 nm or more and 400 nm or less were less than 90% (on a number basis). A charge capacity, a discharge capacity and an initial efficiency that is a ratio thereof at the first cycle of a lithium ion battery for evaluation, which was obtained using the negative electrode sheet, are shown in Table 2.

Comparative Example 6

A negative electrode sheet was obtained in the same manner as that of Example 2 except that the carbon nanotubes (C) were changed to carbon nanofibers (D) (vapor grown carbon fibers, manufactured by Showa Denko K. K., fiber diameter: 150 nm, average fiber length: 6 µm). A charge capacity, a discharge capacity and an initial efficiency that is a ratio thereof, at the first cycle of a lithium ion battery for evaluation, which was obtained using the negative electrode sheet, are shown in Table 2.

TABLE 2

|  |  | Ex. 3 | Comp. Ex. 4 | Comp. Ex. 5 | Comp. Ex. 6 |
| --- | --- | --- | --- | --- | --- |
| Carbon particle (A) | Parts by mass | 78.6 | 78.6 | 82.9 | 82.9 |
| Particle (B) | Parts by mass | 8.7 | 8.7 | 9.2 | 9.2 |
| CNT (C) | Parts by mass | 8.7 | 8.7 | 3.9 | 0.0 |
| CNF (D) | Parts by mass | 0.0 | 0.0 | 0.0 | 3.9 |
| CMC | Parts by mass | 2.0 | 2.0 | 2.0 | 2.0 |
| SBR | Parts by mass | 2.0 | 2.0 | 2.0 | 2.0 |
| Particle (B).CNT (C) Manner of Mixing |  | High-Pressure Dispersing | Dry Mixing | Ball mill | — |
| (B)/(C) mass ratio |  | 1.00 | 1.00 | 2.36 | — |
| (B) – (C) State |  | Flocculated | Aggregated | Aggregated | — |
| Charge capacity | mAh/g | 763.1 | 514.0 | 605.6 | 523.4 |
| Discharge capacity | mAh/g | 556.2 | 357.7 | 462.1 | 342.6 |
| Initial efficiency | % | 72.9 | 69.6 | 76.3 | 65.5 |

When the flocculated body comprising the particles (B) and the carbon nanotubes (C) is obtained according to an embodiment of the present invention and mixed with the carbon particles (A), a negative electrode material in which the particles (B) and the carbon nanotubes (C) are homogeneously dispersed can be obtained. A battery obtained using the negative electrode sheet comprising the negative electrode material has high charge capacity and high discharge capacity, and high initial efficiency.

In the negative electrode material (Comparative Example 5) obtained by processing using the ball mill, the initial efficiency is low because the carbon nanotubes are fragmented and the conductive paths are not sufficiently formed between the particles (B). Further, in the negative electrode material (Comparative Example 6) in which the carbon nanofibers having a thick fiber diameter are used, the charge capacity and discharge capacity are low because the conductive paths are hardly formed between the particles (B).

The invention claimed is:

1. A negative electrode material for lithium ion secondary battery comprising:
   carbon particles (A) having a 50% particle size ($D_{50}$) in a volume cumulative particle size distribution of not less than 2 µm and not more than 40 µm; and
   flocculates in which particles (B) containing an element capable of occluding/releasing lithium ions; and
   carbon nanotubes (C) of which not less than 95% by number has a fiber diameter of not less than 5 nm and not more than 40 nm,
   wherein the carbon nanotubes (C) are flocculated, and
   in a flocculated body of the carbon nanotubes (C), the particles (B) are dispersed in a state of primary particles having a number average particle size of not less than 10 nm and not more than 100 nm or in a state of secondary particles having a number average particle size of not less than 10 nm and not more than 1000 nm.

2. The negative electrode material for lithium ion secondary battery according to claim 1, wherein a number average particle size of primary particles of the particles (B) is not more than 100 nm.

3. The negative electrode material for lithium ion secondary battery according to claim 1, wherein an aspect ratio of the carbon nanotubes (C) is not less than 100.

4. The negative electrode material for lithium ion secondary battery according to claim 1, wherein a ratio of a mass of the particles (B) to a mass of the carbon nanotubes (C) is not less than 1 and not more than 6.

5. The negative electrode material for lithium ion secondary battery according to claim 1, wherein the particles (B) contain at least one element selected from the group consisting of Si, Sn, Ge, Al and In.

6. The negative electrode material for lithium ion secondary battery according to claim 1, wherein not less than 95% by number of the particles (B) in the negative electrode material have a particle size of not less than 10 nm and not more than 400 nm.

7. A lithium ion secondary battery comprising the negative electrode material for lithium ion secondary battery according to claim 1.

8. A method for producing the negative electrode material for lithium ion secondary battery according to claim 1 comprising the steps of:
   pressing a mixed liquid comprising the particles (B) containing an element capable of occluding/releasing lithium ions, the carbon nanotubes (C) of which not less than 95% by number have a fiber diameter of not less than 5 nm and not more than 40 nm, and water into a pulverizing nozzle of a high-pressure dispersing device to obtain a paste or a slurry;

drying the paste or the slurry into a powder; and mixing the powder and the carbon particles (A) having a 50% particle size ($D_{50}$) in a volume cumulative particle size distribution of not less than 2 μm and not more than 40 μm.

9. The negative electrode material for lithium ion secondary battery according to claim 1, wherein the carbon particles (A) are graphite particles.

10. The negative electrode material for lithium ion secondary battery according to claim 1, wherein the particles (B) contain at least one element selected from the group consisting of Sb, Pb, Ag, Mg, Zn, Ga, Bi, Si, Sn, Ge, Al and In.

11. The negative electrode material for lithium ion secondary battery according to claim 1, wherein the carbon particles (A) are not less than 90% on a number basis to have a particle size of not less than 1 μm and not more than 50 μm.

12. The negative electrode material for lithium ion secondary battery according to claim 1, wherein the carbon particles (A) have a 10% particle size ($D_{10}$) in the volume cumulative particle size distribution of not less than 1 μm.

\* \* \* \* \*